United States Patent
Kim et al.

(10) Patent No.: US 7,096,207 B2
(45) Date of Patent: Aug. 22, 2006

(54) ACCELERATED LEARNING IN MACHINE VISION USING ARTIFICIALLY IMPLANTED DEFECTS

(76) Inventors: Donglok Kim, 25330 SE. 36th Ct., Issaquah, WA (US) 98029; Shih-Jong J. Lee, 15418 SE. 53rd Pl., Bellevue, WA (US) 98006; Seho Oh, 5229 107th St. SW., Mukilteo, WA (US) 98275

( * ) Notice: Subject to any disclaimer, the term of this patent is extended or adjusted under 35 U.S.C. 154(b) by 703 days.

(21) Appl. No.: 10/104,647

(22) Filed: Mar. 22, 2002

(65) Prior Publication Data

US 2003/0182251 A1   Sep. 25, 2003

(51) Int. Cl.
   *G06N 5/00*   (2006.01)
(52) U.S. Cl. .......................... 706/12; 706/45
(58) Field of Classification Search ............... 706/12, 706/45; 700/28, 29, 44; 434/224
   See application file for complete search history.

(56) References Cited

U.S. PATENT DOCUMENTS 5,273,434 A * 12/1993 Peck ........................... 434/224
6,047,221 A *  4/2000 Piche et al. .................. 700/44
6,278,899 B1 *  8/2001 Piche et al. .................. 700/44
6,381,504 B1 *  4/2002 Havener et al. ............... 700/44

OTHER PUBLICATIONS

J. R. Quinlan, C4.5 Programs For Machine Learning, Morgan Kaufmann, 1993, pp. 35-43.
T. M. Mitchell, Machine Learning, McGraw-Hill, 1997, Chapter 11, pp. 307-330.
B. Gu, B. Liu, F. Hu, H. Liu. "Efficiently Determine the Starting Sample Size for Progressive Sampling." Workshop on Research Issues in Data Mining and Knowledge Discovery, Santa Barbara, CA, Workshop notes, May 2001.
Ballard and Brown, "Computer Vision", ISBN 0-13-165316-4, Prentice Hall 1982, Chapter 3, pp. 67-69.

* cited by examiner

Primary Examiner—Wilbert L. Starks, Jr.

(57) ABSTRACT

A learning acceleration method is disclosed that can be applied to multiple types and stages of learning to enhance the learning efficiency and outcome. Artificially created training samples can improve representation of all classes in the training set, decrease the difficulty of obtaining sufficient training samples, and decrease the difficulty of unequal sample prevalence. Two specific embodiments of learning acceleration are disclosed: learning accelerated algorithm training and learning accelerated start-up learning. Three objects of interest implantation methods are disclosed: texture mapping of defects, parametric synthesis of negative samples, and manual image editing.

24 Claims, 10 Drawing Sheets

ACCELERATED LEARNING IN MACHINE VISION USING ARTIFICIALLY IMPLANTED DEFECTS

TECHNICAL FIELD

This invention relates to learning enhancement in image based decision systems.

BACKGROUND OF THE INVENTION

An image-based decision system processes and extracts information from an image to make decisions on the presence of objects of interest. Examples are image decision systems for determining disease, defects, the acceptance or rejection of measurement parameters such as dimensions, intensity, structures, etc. Image-based decision systems have broad application areas such as machine vision, non-contact gauging, inspection, robot guidance, medical imaging, etc. Learning or teaching is required to optimize an image-based decision system for non-trivial applications. In machine learning, an important attribute of good learning samples is their complete representation of the distribution of real world data where the final system will operate. In general, learning is most reliable when the learning samples follow a distribution similar to the distribution of data in the real application where the system will be used. Therefore, learning often requires time and data, in amounts that are not usually available because application environments frequently change or include rare (but important) events.

Most prior art methods of machine learning rely on the assumption that the distribution of learning samples is identical or sufficiently close to the distribution found in the real world. However, there are many instances where obtaining the learning samples that mimic the real world distribution is not feasible or economical. In many cases, the negative learning samples (such as defects) are hard to obtain and it is difficult to train the system when the system is configured to process for a newer set of data. Also, the collected defect samples will likely not show an equal prevalence of each type of defect.

Some types of defects might be omitted entirely in the training process.

For example, in a machine vision system that inspects defects on semiconductor wafers, the input image patterns become different whenever the fabrication line switches to a different Integrated Circuit (IC) design or process level since the wafer pattern varies when a different IC design is put on the wafer.

In this case, the learning system has to additionally learn on new learning samples to be effective, and it would require a cumbersome truth-labeling task for new data, which demands extensive human interaction. Human-provided truth may not be reliable either, especially for ambiguous learning samples where humans tend to have difficulty in rendering consistent truth labels due to the lack of the ability to objectively and quantitatively assess the data. This problem is exacerbated when either positive or negative learning samples are hard to obtain. For the above example, the number of defective wafer images is usually less than 2% of the total number of wafer images to be examined. Therefore, it takes an inordinate amount of time and effort to collect a reasonably large set of learning samples to cover a variety of defects (e.g., scratches, particles, contamination from coating, defocus, exposure, etching or development errors, and chemical mechanical planarization error in different background conditions) to achieve high learning accuracy. Also, the collected defect images will likely not show an equal prevalence of each type of defect. Some types of defects may be omitted entirely. Alternatively, defects that do occur tend to look nearly identical since when they occur, they are repeated by the same causing factor until the error cause is corrected. Therefore, even though a large number of samples are obtained, they may all show essentially the same limited characteristics. The variability of the true application situation is therefore not well represented.

In the case where a sufficient number of learning samples are not available, incremental learning might be used. In incremental learning, the system learns on the new incoming data as they are encountered. However, when positive samples are dominant and negative samples scarce (or vise-versa), the learning takes time to reach a mature state to become useful.

Another known method of overcoming this problem is analytical learning called explanation-based learning [Mitchell, T. M., Machine Learning, WCB/McGraw-Hill, 1997, Chapter 11, pp 307–330]. In this method, the user provides additional information to help the system to narrow down the search space. However, this method requires the intervention of experts who must be very well acquainted with the learning system. This is burdensome and does not usually provide consistent results.

OBJECTS AND ADVANTAGES

An object of the invention is to accelerate learning maturity and enhance learning outcome by supplying artificially implanted objects with utility for learning for image based decision systems. A further object of the invention is to supply positive data to accelerate the learning, if the artificial implantation is done for positive data. A still further object of the invention is to create an environment for extension of basic knowledge wherein characteristics of implanted defects are already known and therefore selecting features for classification is easier or more likely to produce a useful outcome. An advantage of the invention is that it does not require human involvement for effective learning. This reduces human error and decision system learning cost.

SUMMARY OF THE INVENTION

This invention discloses object of interest implantation, a learning acceleration method that can be applied to multiple types and stages of learning to enhance the learning efficiency in decision systems. Object of interest implantation methods of this invention use already observed defects in different data groups. In other words, similar defects are implanted on the new positive learning samples so that the learning becomes complete and more accurate quickly. Since the locations and types of implanted objects of interest are known by the system, no human involvement is required for effective learning. This avoids human error and reduces learning cost.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

The invention provides a simple yet effective method to accelerate the maturity of learning in image-based decision systems. One aspect of this invention artificially generates negative learning samples by implanting defects on non-defective normal images in order to accelerate learning maturity. The simulated defects are often quite representative of the application conditions since in most of the applications, certain characteristics of defects can be determined in advance. An artificial defect can be generated by different methods including (1) texture mapping of a set of defective image pixels onto a target image, (2) applying a set of parameters that is used to define certain geometry and pixel intensity rules in creating defects onto target images, (3) manually editing the known good images. In an embodiment, integrating the defects into normal images creates artificial negative learning sample images. The created learning samples are used to accelerate the maturity of learning. Furthermore, since the locations and types of implanted objects of interest are known by the system, no human involvement is required for truth labeling to enable effective learning. This avoids human error and reduces learning cost.

I. Learning Acceleration Method

The learning in image-based decision systems includes algorithm training and start-up learning. Algorithm designers who develop the basic algorithm architecture and assign default parameters for an image-based decision system typically perform algorithm training. Start-up learning is typically performed in the initial setup of an image-based decision system for a new application. It fine-tunes the algorithm architecture and default parameters for a specific application. The learning acceleration method of this invention enhances efficiency and improves outcome of all stages of learning.

I.1 Algorithm Training

Figure 2:
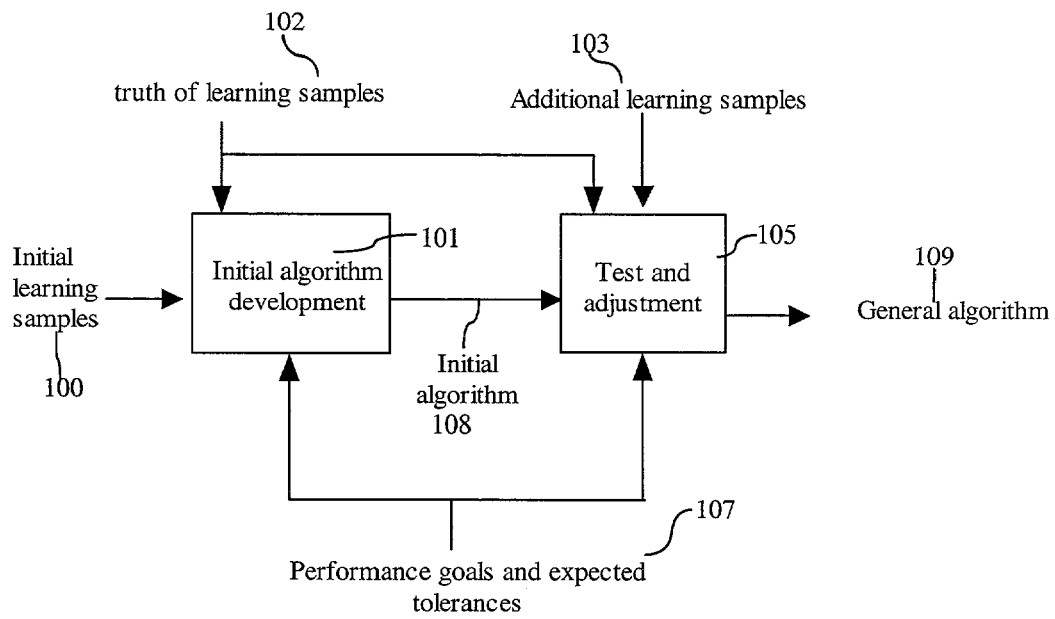
FIG. 2 shows the prior art algorithm training process.

The algorithm training process in a prior art image-based decision system is shown in FIG. 2. As shown in FIG. 2, an initial algorithm development stage 101 receives initial learning samples 100 and creates an initial algorithm 108 having an expected tolerance to achieve performance goals 107. The algorithm can be a simple template matching method with proper template and matching parameters or a complicated image recognition process including image enhancement, feature detection, object classification and learning modules.

The initial algorithm 108 is tested on additional learning samples 103 and is adjusted 105 to achieve the performance goals 107. This results in a general algorithm 109 that includes algorithm architecture and default parameters. The test and adjustment process could be repeated multiple times and new learning samples could be added as they become available. Many applications require a significant number of learning samples to achieve a satisfactory result and robust performance. Furthermore, the truths of learning samples 102 have to be entered and verified in the prior art algorithm training process. Incomplete or biased data and/or incorrect truth labels could significantly degrade the performance of the resulting algorithm in the application.

Figure 1:
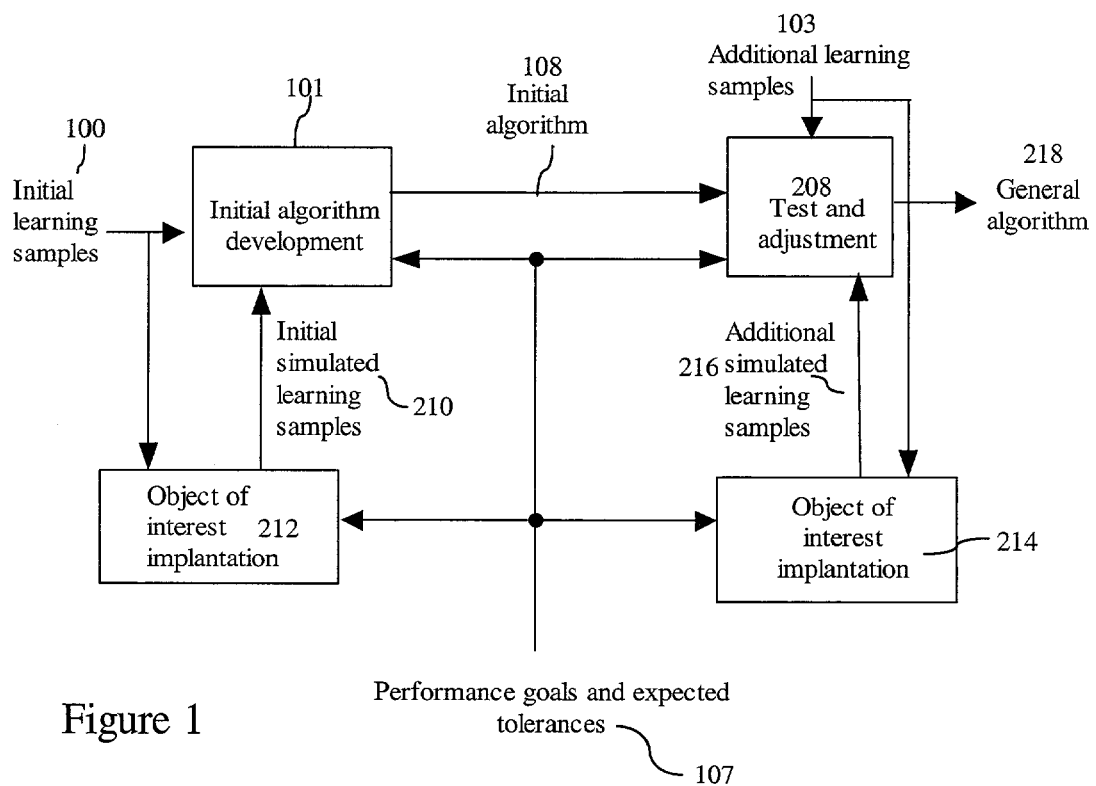
FIG. 1 shows the learning accelerated algorithm training process.

The learning acceleration method of the invention speeds up the learning process and learning maturity by generating objects of interest to enhance the algorithm training process. In a preferred embodiment of the invention, the algorithm training process with accelerated learning is shown in FIG. 1. As shown in FIG. 1, the initial learning samples 100 include perfectly normal samples used for the initial algorithm development 101. These initial learning samples 100 are also used by the object of interest implantation 212 to prepare the initial simulated learning samples 210. The initial simulated learning samples 210 include altered samples that are artificially created from the initial learning samples 100. They may also include systematically altered normal samples within the tolerance 107 from the initial learning samples 100. Together with the initial learning samples 100, these initial simulated learning samples 210 assure the basic performance of the initial algorithm 101 to cover the learning cases. The additional simulated learning samples 216 include ambiguous normal samples as well as defective samples that contain features that are near the acceptable tolerances. This assures a good trade-off balance between defect detection sensitivity and normal detection specificity. The initial algorithm is tested and adjusted 208 using additional learning samples 103 and the additional simulated learning samples 216 to create a general algorithm 218. The learning acceleration method is most effective in the test and adjustment stage 208 since it can generate a lot of learning samples that are near the tolerance limit that are hard to acquire from real applications. Furthermore, the truth of the simulated ambiguous objects is well defined. This avoids the difficult and error-prone process of labeling ambiguous real objects.

I.2 Start-up Learning

Figure 3:
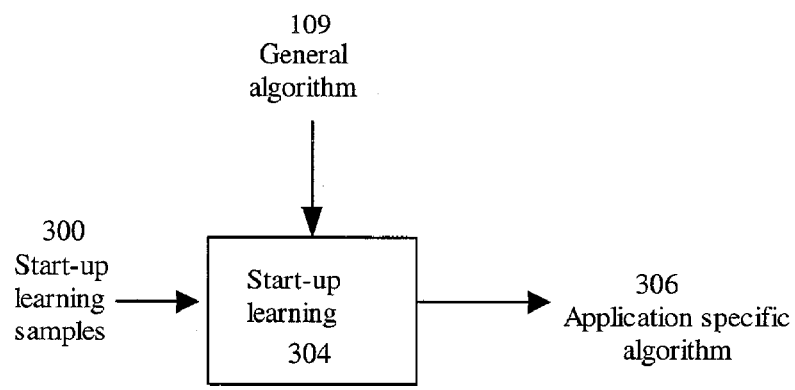
FIG. 3 shows the prior art start-up learning process.
Figure 4:
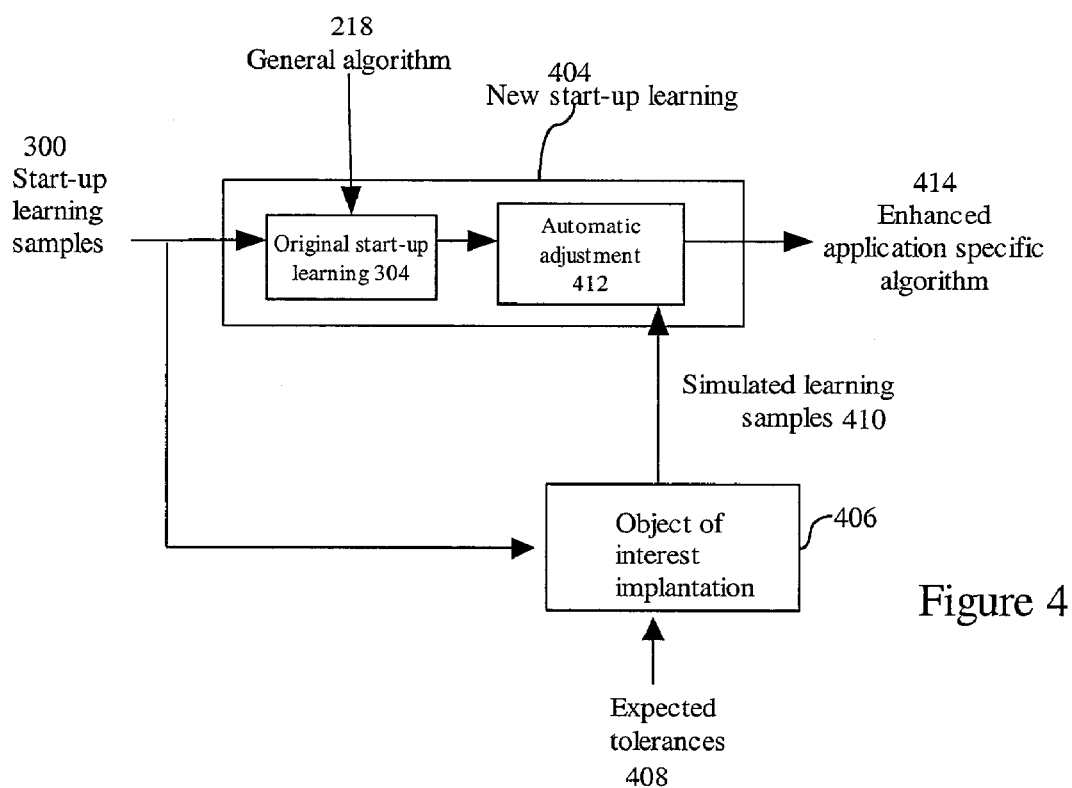
FIG. 4 shows the learning accelerated start-up learning process.

The start-up learning process flow in a prior art image-based decision system is shown in FIG. 3. As shown in FIG. 3, the start-up learning process 304 inputs a set of start-up learning samples 300 and general algorithm 109. It uses the start-up learning samples to fine-tune the parameters and/or algorithm flow of the general algorithm. This results in an application specific algorithm 306. The start-up learning samples 300 are acquired from the application specific data. Start-up learning 304 is normally performed during system setup or application process changes. It has to be simple and efficient. Therefore, typical start-up learning samples consist of only a small number of normal images. However, it is not easy to select proper algorithm parameters using only a small number of normal images without examples of defective images. The learning acceleration method of this invention allows users to generate objects of interest to enhance the start-up learning process. FIG. 4 shows an embodiment having a start-up learning process with accelerated learning.

As shown in FIG. 4, simulated learning samples 410 are created by object of interest implantation 406 within expected tolerances 408. The simulated learning samples 410 are used to automatically adjust the parameters 412 determined from original start-up learning process 304 that is based on start-up learning samples 300 (which are primarily normal samples) and the general algorithm 218. The general algorithm can be obtained either from prior art algorithm training (FIG. 2) or learning accelerated algorithm training (FIG. 1). The simulated learning samples allow a good trade off balance between sensitivity and specificity during automatic adjustment within the new start-up learning 404 to produce an enhanced application specific algorithm 414. This is not otherwise possible without the simulated learning samples 410. Therefore, the efficiency of the start-up learning is significantly improved.

The above learning acceleration embodiments are not intended to be exhaustive. Those skilled in the art should recognize that the learning acceleration methods of this invention could be applied to other types or stages of learning to enhance the learning efficiency and outcome by object of interest implantation.

II. Objects of Interest Implantation

In one aspect of the invention, the simulated object of interest is represented by $$O(x, y) = G(x, y; I(x, y))I(x, y) + F(x, y; I(x, y)) \quad \text{(Eq. 1)}$$

where $O(x, y)$ is the resulting pixel, and $G(x, y; I(x, y))$ and $F(x, y; I(x, y))$ are gain and offset from the background image pixel $I(x, y)$. Note that G or F can be a function of $I(x, y)$ when the gain or offset needs to be adaptive to the background pixel values. In regions where objects of interest are not implanted, $G(x, y; I(x, y))$ is set to 1.0 and $F(x, y; I(x, y))$ is set to 0.0. Inside the region where an object of interest is implanted, the object function determines whether the implanted object would appear brighter or darker than normal. For example, if $G(x, y; I(x, y)) < 1.0$ and $F(x, y; I(x, y)) = 0.0$, the implanted object would appear to be darker than normal.

With object of interest implantation, we can create any desired number and type of positive or negative learning samples, which allows the image-based decision system to achieve fast and high-accuracy machine learning. In the following sections, we describe the detailed embodiment of three methods of objects of interest implantation.

II.1 Objects of Interest Implantation Using Texture Mapping

When the manufacturing process in a factory needs to be reconfigured for a newer product, the image-based decision system that inspects the target objects within the process also needs to learn for this new product. As mentioned above, this invention overcomes the difficulty in collecting sufficiently large set of learning samples. In many cases, as long as the same manufacturing equipment is used, similar defect causes tend to affect the target products regardless of the manufacturing process changes. However, their appearance may be quite different due to the design and background changes or changes to the imaging conditions such as camera angle or illumination.

For example, in a semiconductor front-end inspection system, similar defect causes, e.g., scratches, particles, coating error and focus errors, exist on the wafers across different products (each product has its own IC design and therefore exhibits unique patterns on the wafer). The inspection system can learn for a new product from the defects found in different products. The main concern is how we can utilize the defects found in different products for the new product, so that the system can adapt itself to the new product quickly and accurately. The method of this invention extracts the defects from different products and performs texture mapping into normal images of the new product (note that normal images are usually obtained easily). To explain this method in more detail, denote $P_a$=previous product where the defects were found.

$P_b$=new product that the system has to learn $I_a$=a wafer image that belongs to $P_a$ and contains defect(s)

$I_{na}$=a wafer image that belongs to $P_a$ and contains no defect (this could be obtained by averaging multiple non-defect images in $P_a$)

$I_b$=a wafer image that belongs to $P_b$ and contains defect(s)

$I_{nb}$=a wafer image that belongs to $P_b$ and contains no defect (this could be obtained by averaging multiple non-defect images)

$G_a$=a gain image that is used in Eq. 1 for all x and y locations in the previous product image $G_b$=a gain image that is used in Eq. 1 for all x and y locations in the new product image $F_a$=an offset image that is used in Eq. 1 for all x and y locations in the previous product image $F_b$=an offset image that is used in Eq. 1 for all x and y locations in the new product image.

First, we obtain the gain image $G_a$ and offset image $F_a$ such that $I_a(x, y) = G_a(x, y)*I_{na}(x, y) + F_a(x, y)$. Since this is an indeterminate equation, there could be many combinations of $G_a$ and $F_a$ images that meet the equation. One simple method is to set $F_a(x, y) = 0$ for all x and y and obtain a unique gain image $G_a$. Other solutions can be obtained for any chosen $F_a$ (or $G_a$). Another method can use smoothness constraint of $G_a$ and $F_a$ to reduce abnormally strong gain or offset values at certain locations. Once $G_a$ and $F_a$ are obtained, an extraction procedure is usually required to create $G_b$ and $F_b$. This extraction procedure can further remove abnormally strong gain or offset values. A simple method to extract $G_b$ and $F_b$ is filtering, e.g., linear two-dimensional filtering, morphological filtering, other nonlinear filtering such as rank filters, etc. Sometimes, $G_a$ and $F_a$ can be directly used for $G_b$ and $F_b$ when $G_a$ and $F_a$ are already good enough to properly represent defects.

After $F_b$ and $G_b$ images obtained, we can create defect images in new product group $P_b$. In particular, a synthesized defective image $I_b$ that belongs to $P_b$ can be obtained with the following equation:

$$I_b(x, y) = G_b(x, y)I_{nb}(x, y) + F_b(x, y)$$

Note that, while the above computations are performed on all pixels in the images, similar equations can be applied for local regions of interest in the image, too. Note also that the embodiment explained above for the case of wafer inspection system is general enough to be applied to any other similar situation where it is difficult to obtain enough negative (or positive, depending on the definition of negative and positive) learning samples for training.

II.2 Objects of Interest Implantation Based on Geometry and Intensity Models Objects of interest can also be created from combinations of models (mathematical functions) with suitable parameter values. These models define the shape and pixel intensity of objects of interest. In the case of a wafer inspection system, we can construct the geometry and pixel intensity models for defects of new product using the observed defects found in the known products. Some embodiments of objects of interest construction models are explained below.

II.2.1 Circle Model

Figure 5:
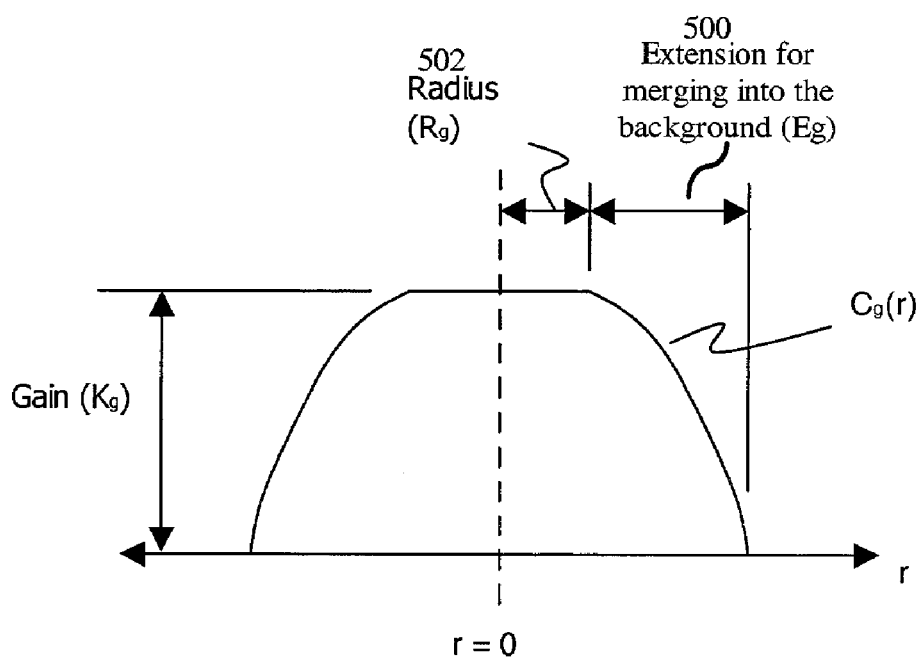
FIG. 5 shows a cross section of a circle model with gain parameters.
Figure 6:
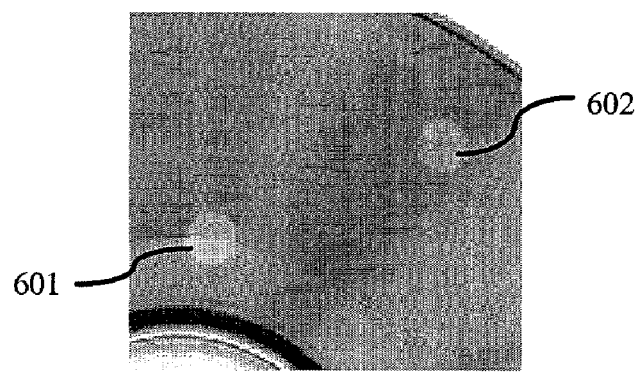

In one embodiment, a circle model is defined with two sets of three constant parameters: intensity gain ($K_g$), radius ($R_g$) for gain, gain extension ($E_g$) for merging into the background, intensity offset ($K_f$), radius ($R_f$) for offset, and offset extension ($E_f$) for merging into the background. FIG. 5 shows one-dimensional cross section of a circle model with gain parameters. Note that, while only the first set of parameters ($K_g$, $R_g$, and $E_g$) are shown in FIG. 5, the second set of parameters should look similar. The gain implantation function ($G(r)$) is defined as $$G(r) = \begin{cases} K_g & \text{if } r \leq R_g \\ C_g(r) & \text{if } R_g < r \leq (R_g + E_g) \\ 1 & \text{otherwise} \end{cases}$$

and offset implantation function (F(r)) is defined as $$F(r) = \begin{cases} K_f & \text{if } r \leq R_f \\ C_f(r) & \text{if } R_f < r \leq (R_f + E_f) \\ 0 & \text{otherwise,} \end{cases}$$

where r is the distance from the center of the circle model.

The curve $C_g(r)$, defined over the extension ($E_g$) area 500, allows the defect to gracefully merge into the background image. In one embodiment, the curve can be represented as $$C_g(r) = 2(K_g-1)/(1+(r-R_g)^2/E_g^2) + 2 - K_g \text{ for } R_g < r \leq (R_g + E_g).$$

Similarly, in one embodiment of the invention, $C_f(r)$ can be represented as:

$$C_f(r) = 2K_f/(1+(r-R_f)^2/E_f^2) - K_f \text{ for } R_f < r \leq (R_f + E_f).$$

The circle model can then be implanted to the target image with the following rule:

$$I_b(r) = G(r) * I_a(r) + F(r) \text{ for } r \leq \max((R_g + E_g), (R_f + E_f)),$$

where $I_b$ and $I_a$ are the images as defined in Section II.1 and the origin of r is the center of the circle model at a desired implantation location. Those skilled in the art should recognize that additional parameters can be defined and the center coordinate can be adjusted within the scope of the invention.

II.2.2 Donut Model

Figure 7:
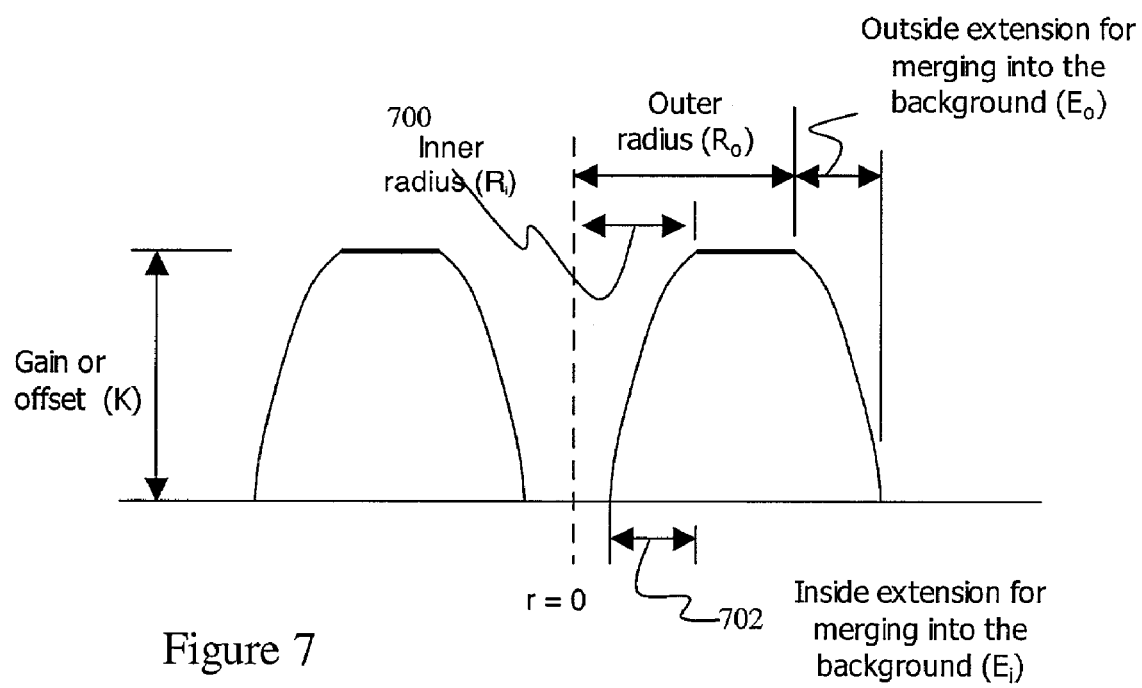
FIG. 7 shows a cross section of donut model.
Figure 8:
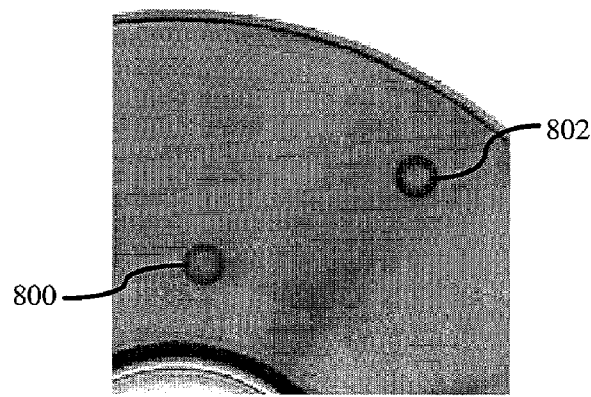

In one embodiment of the invention, a donut model is similar to the circle model, except that it has two more parameters: an inner ring 700 and an inward merge region 702, as shown in FIG. 7. Similar to the case of circle model, the parameters K, $R_o$, $R_i$, $E_o$ and $E_i$ can be used to define either gain function or offset function. We intentionally omit the subscript g or f to each of these parameters in FIG. 7 since a similar concept is used for both gain and offset parameters. Also, the curves in the extension area ($E_i$ and $E_o$) can be defined in a similar manner to the case of a circle model. Those skilled in the art should recognize that additional parameters can be defined and the center coordinate can be adjusted without changing the essence of the invention.

II.2.3 Rectangle Model

Figure 9A:
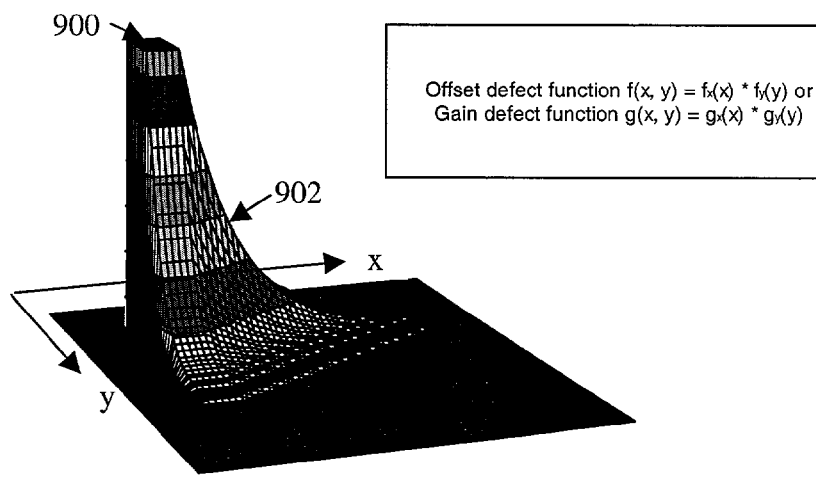
FIG. 9B shows the rectangle model cross section along y=0 plane.
Figure 9B:
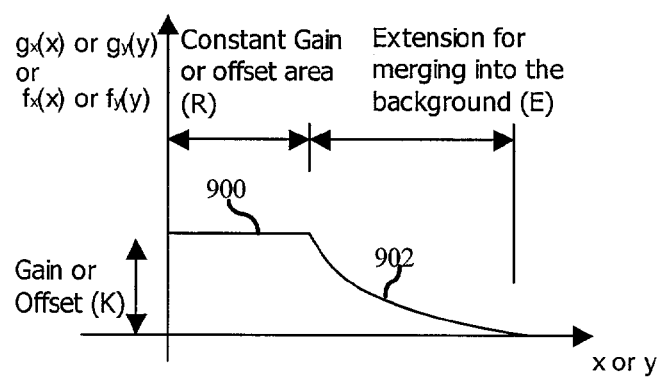
Figure 10:
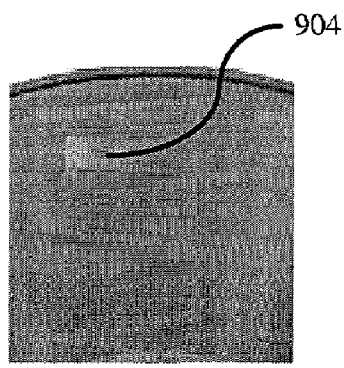

In one embodiment of the invention, a rectangle model is defined over a rectangular region as shown in FIG. 9B. FIG. 9B show an offset defect function $f(x, y) = f_x(x) * f_y(y)$ or gain defect function $g(x, y) = g_x(x) * g_y(y)$. The constant gain or offset area (R) 900 defines a portion of a rectangle that has a constant gain or offset. An extension 902 for merging into the background is also shown. Those skilled in the art should recognize that additional parameters can be defined and the center coordinate can be adjusted without changing the essence of the invention.

II.2.4 Spline Curve Model

Figure 11:
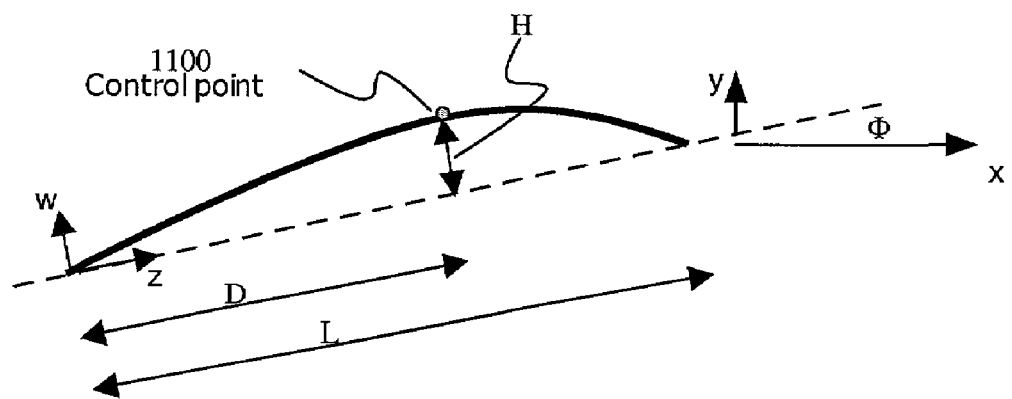
FIG. 11 shows a spline model.
Figure 12:
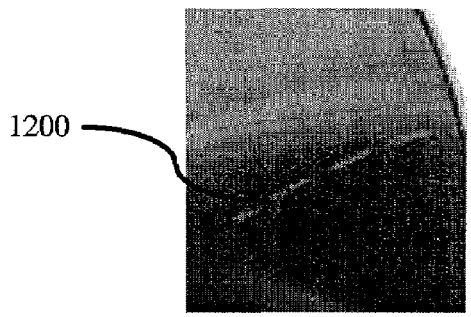

In one embodiment of the invention, a spline curve model is used to create scratch-like defects. We describe here cubic spline curves in one embodiment of the invention, as shown in FIG. 11. In this embodiment, the spline curve is defined by the control point 1100, height (H), horizontal distance (D) to the control point, horizontal length (L) of the spline, and the angle (D) of the spline curve. The curve shown in FIG. 11 consists of two cubic splines connected together at the control point 1100. The two cubic splines can be obtained by solving $$w(z) = \begin{cases} az^3 + bz & \text{if } 0 < z \leq D \\ c(z-L)^3 + d(z-L) & \text{if } D < z \leq L, \end{cases}$$

where z is the position from the initial point and along the direction of the defect, with the constraints that the height value and the slope at the top is zero, that is, $aD^3 + bD = H$, $3aD^2 + b = 0$, $c(D-L)^3 + d(D-L) = H$, and $3c(D-L)^2 + d = 0$.

The solution is $$w(z) = \begin{cases} -\dfrac{H}{2D^3}z^3 + \dfrac{3H}{2D}z & \text{if } 0 < z \leq D \\ -\dfrac{H}{2(D-L)^3}(z-L)^3 + \dfrac{3H}{2(D-L)}(z-L) & \text{if } D < z \leq L. \end{cases}$$

In one embodiment of the invention, the spline model has the following additional parameters to the defect pixel values to be implanted:

Constant gain, constant gain effective length: The constant gain is effective for a certain number of pixels defined by constant gain effective length along the spline curve.

Side extension: This parameter allows the defect to gracefully merge into the background image in both sides of the spline.

Tail extension: This parameter allows the defect to gracefully merge into the background image after constant gain effective length until the end of the spline.

Oscillation period: The pixel intensity can have sinusoidal (or other characteristic) oscillations along the spline curve, using the computed intensity from above parameters as the magnitude.

Those skilled in the art should recognize that additional parameters can be defined and the center coordinate can be adjusted without changing the essence of the invention.

II.2.5 Comet Model

Figure 13A:
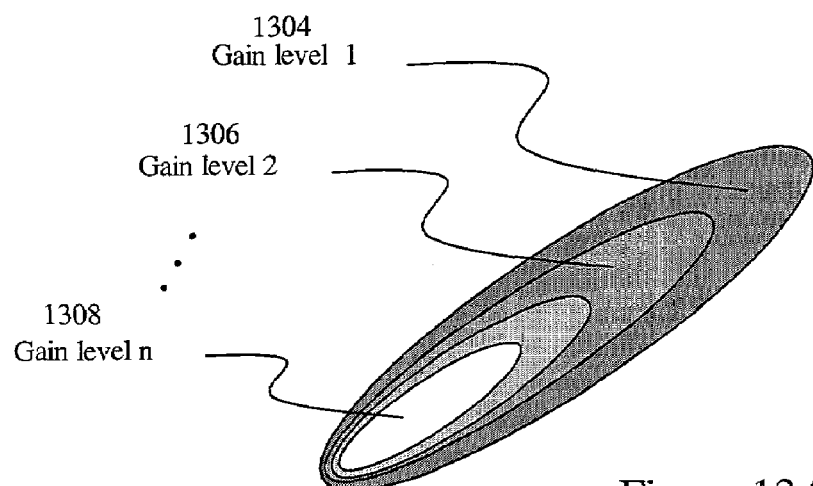
FIG. 13A shows a comet model.
Figure 13B:
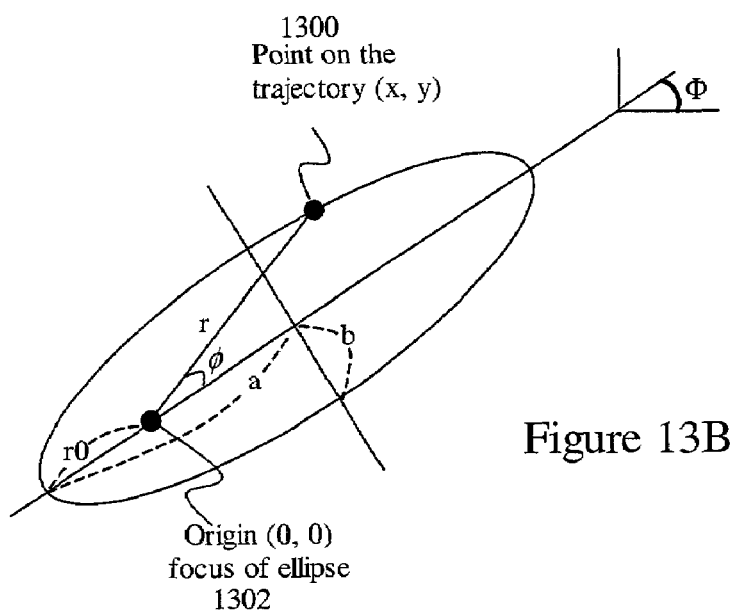
FIG. 13B shows a comet model represented by an ellipse.
Figure 14:
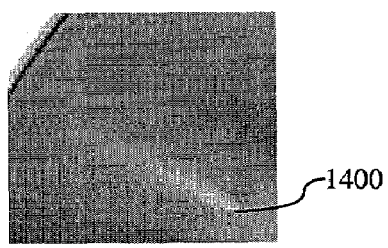
Figure 15A:
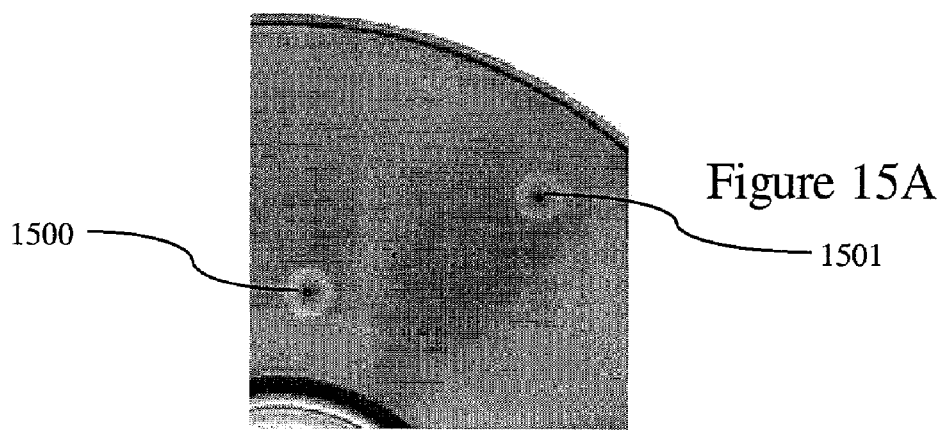
Figure 15B:
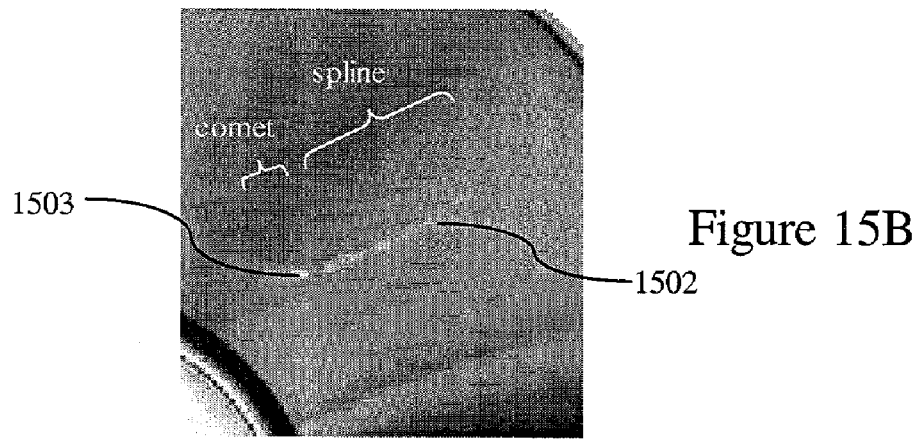
Figure 15C:
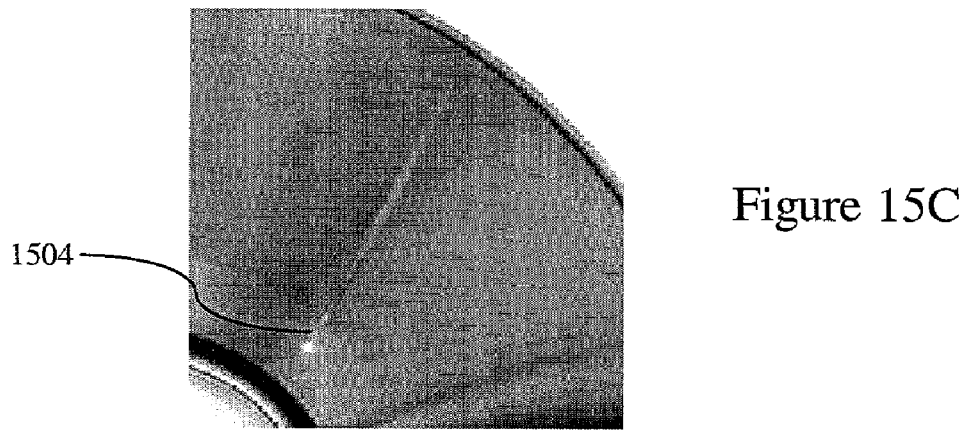
Figure 16A:
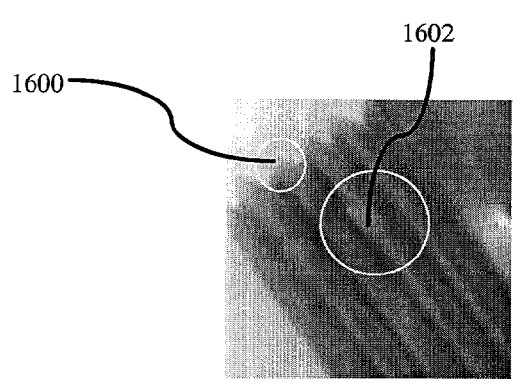
Figure 16:
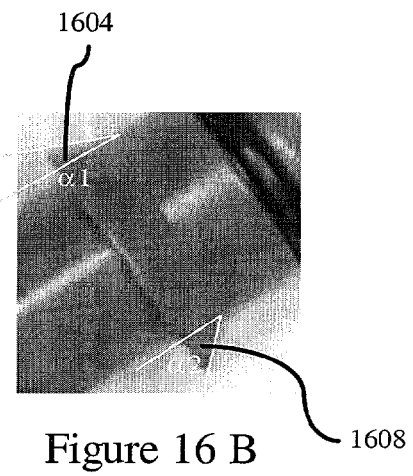
Figure 16C:
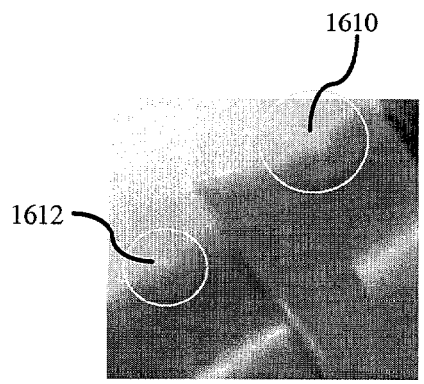
Figure 16D:
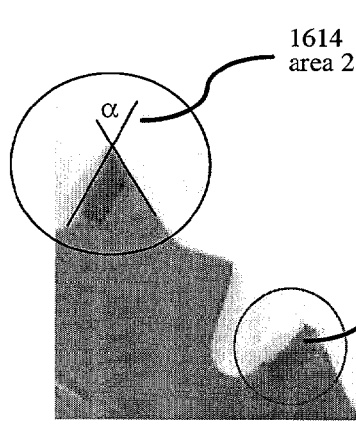
Figure 16E:
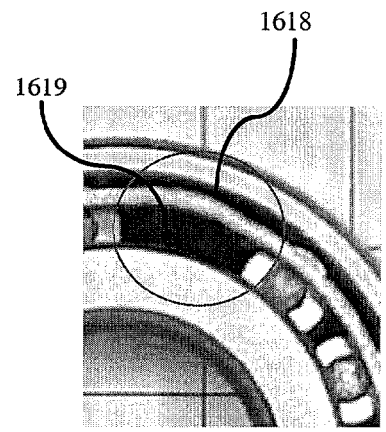
Figure 17:
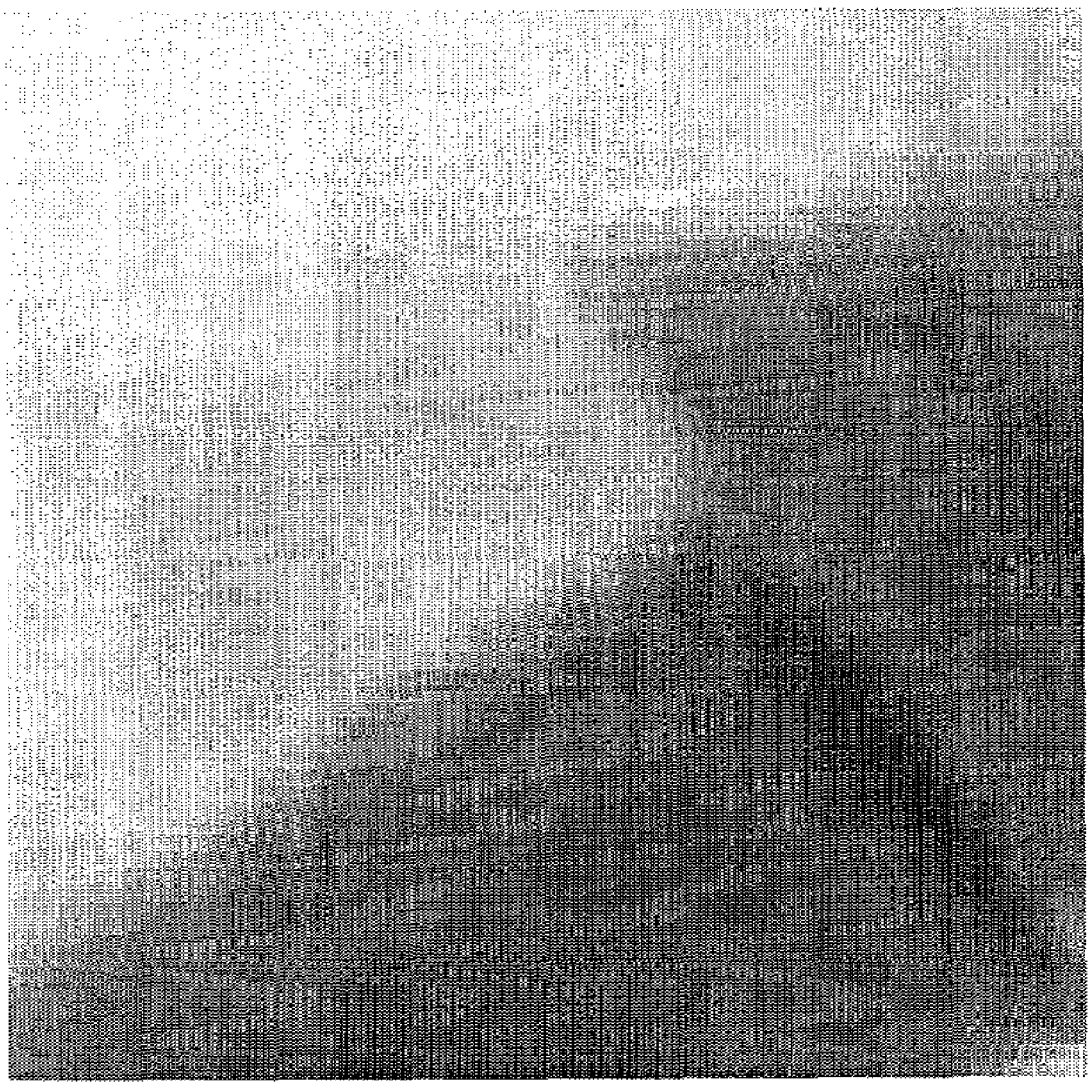

In one embodiment of the invention, a comet model is used to mimic object shapes similar to a comet trajectory as shown in FIG. 13A. FIG. 13A shows different gain contour levels 1304, 1306, 1308 within the simulated comet trajectory. In an embodiment, shown in FIG. 13B, the comet trajectory 1300 is an ellipse where the trajectory is represented by the distance from its one focus 1302, i.e., $$r = \frac{r_0}{1 - e\cos(\varphi - \Phi)},$$

where r0 is the minimum distance of the trajectory, $\phi$ is the angle of points on the trajectory, e is the eccentricity of the ellipse and $r=\sqrt{x^2+y^2}$.

To allows a smooth transition of the object intensity to the background, the gain at (x, y) location along a given trajectory is given as a function of r0, i.e., G(r0), where G is the same function as defined in Section II.2.1. In other words, for a given location (x, y), we obtain r0 as $$r0 = r(1 - e\cos(\varphi - \Phi))$$
$$= r - e(r\cos\varphi\cos\Phi + r\sin\varphi\sin\Phi)$$
$$= r - e(x\cos\Phi + y\sin\Phi)$$

and apply gain G(r0) to the location (x, y).

In one embodiment of the invention, the constant gain area ($R_g$) and tail-off extension amount ($E_g$) of the gain function G can be given as parameters. Those skilled in the art should recognize that additional parameters can be defined and the center coordinate can be adjusted without changing the essence of the invention.

II.2.6 Combination of Models

The above models can be combined to construct more sophisticated objects.

Those skilled in the art should recognize that the models disclosed in this invention are intended to be illustrative, not exhaustive. Other models and model combinations can be used in the invention to implant objects of interest without deviating from the essence of the invention.

II.3 Objects of Interest Implantation Via Manual Image Editing

The third method of implanting objects of interest is to directly edit the known good images to create negative (or positive) learning samples. A conventional image editing software/hardware tool can be used for this task.

This method can be used to create objects of interest that cannot be obtained with the methods described in Sections II.2 and II.3. Note that the created images can be used as the learning samples for the current product, and also as one of the master images, i.e., $I_a$ in Section II.1, which is used to generate the texture mapping function G and F.

Those skilled in the art should recognize that the objects of interest disclosed in this invention are intended to be illustrative, not exhaustive. Other types of objects, either removed or added, and in any combination, can be used in the invention to implant objects of interest.

III. Discussion

This invention discloses a learning acceleration method that can be applied to multiple types and stages of learning to enhance the learning efficiency and outcome by object of interest implantation. Two specific embodiments of learning acceleration are disclosed: learning accelerated algorithm training process and learning acceleration start-up learning process. Three objects of interest implantation methods have been disclosed to overcome the difficulty of obtaining sufficient negative and/or positive learning samples in image-based decision learning systems: texture mapping of defects, parametric synthesis of negative samples, and manual image editing. Of course, if we know all characteristics of possible negative (or positive) learning samples and the noise characteristics of incoming images, we would not need to train the data and would not even need a learning system. However, since the noise characteristics of incoming images are unknown to us, predicting how the same defect would affect the learning is not possible. Even though the same kind of object images are captured, the images contain different pixel values at the same location unless the image capture environment is tightly controlled. When our object of interest implantation methods are used with images containing variations, the implanted objects can provide valuable information to the learning that cannot simply be obtained from the defect models alone.

To automate the object implantation procedure, we can use template matching methods such as normalized correlation [Ballard and Brown, "Computer Vision", ISBN 0-13-165316-4, Prentice Hall 1982, Chapter 3, pp 67–69] or invariant matching [U.S. patent application Ser. No. 09/895,150 entitled, "A Rotation and Scale Invariant Pattern Matching Method", by Shih-Jong J. Lee et. al. filed Jun. 29, 2001]. Local templates can be prepared in advance to find location for object inspection, depending on the shape of the product to be inspected. Once the location is determined, any combination of the three methods of this invention can be used to implant the objects of interest. Although the third method, manual image editing described in Section II.3, requires human interaction in creating the initial objects of interest, we can still automate the implantation procedure if the created objects of interest are used as one of the master images, i.e., $I_a$ in Section II.1.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different weighting, confidence determination, and accuracy assessment processes, and that various modifications, both as to the method details and selection procedures, can be accomplished without departing from the scope of the invention itself.

What is claimed is:

1. A computerized accelerated learning method for image-based decision system applications such as machine vision, non-contact gauging, inspection, robot guidance, medical imaging to accelerate learning maturity and enhance learning outcome comprises the following steps:
   (a) input learning sample images;
   (b) perform object of interest implantation on images using the learning sample images to generate simulated learning samples containing simulated objects of interest in the images;
   (c) perform computerized algorithm learning using the input learning sample images and the simulated learning sample images.

2. The method of claim 1 wherein the object of interest implantation on images includes a texture mapping method extracting the defects from different products and mapping into normal images of the new product.

3. The method of claim 1 wherein the object of interest implantation on images uses geometry and intensity models defining the shape and pixel intensity of objects of interest.

4. The method of claim 3 wherein the geometry and intensity models use one or more image models selected from the set consisting of:
   (a) image circle model,
   (b) image donut model,
   (c) image rectangle model,
   (d) image spline curve model, and
   (e) image comet model.

5. The method of claim 1 wherein the object of interest implantation on images uses manual image editing of known good images to create negative or positive learning samples.

6. The method of claim 1 wherein the object of interest implantation on images uses a combination of methods selected from the set consisting of:
  (a) texture mapping method extracting the defects from different products and mapping into normal images of the new product,
  (b) geometry and intensity modeling defining the shape and pixel intensity of objects of interest, and
  (c) manual image editing of known good images to create negative or positive learning samples.

7. The method of claim 1 wherein learning includes an computerized algorithm training process.

8. The method of claim 1 wherein the learning includes a computerized start-up learning process.

9. An accelerated computerized algorithm training method for image-based decision system applications such as machine vision, non-contact gauging, inspection, robot guidance, medical imaging to accelerate learning maturity and enhance learning outcome comprises the following steps:
  (a) input learning sample images;
  (b) perform object of interest implantation on images using the learning samples to generate simulated learning samples containing simulated objects of interest in the images;
  (c) perform computerized algorithm training using the learning sample images and the simulated learning samples images.

10. The method of claim 9 wherein the object of interest implantation on images includes a texture mapping method extracting the defects from different products and mapping into normal images of the new product.

11. The method of claim 9 wherein the object of interest implantation on images uses geometry and intensity models defining the shape and pixel intensity of objects of interest.

12. The method of claim 11 wherein the geometry and intensity models use at least one image model selected from the set consisting of:
  (a) image circle model,
  (b) image donut model,
  (c) image rectangle model,
  (d) image spline curve model, and
  (e) image comet model.

13. The method of claim 9 wherein the object of interest implantation on images uses manual image editing of known good images to create negative or positive learning samples.

14. The method of claim 9 wherein the object of interest implantation on images uses a combination of methods selected from the set consisting of:
  (a) texture mapping method extracting the defects from different products and mapping into normal images of the new product,
  (b) geometry and intensity modeling defining the shape and pixel intensity of objects of interest, and
  (c) manual image editing of known good images to create negative or positive learning samples.

15. The method of claim 9 wherein the computerized algorithm training further comprises:
  1. input additional learning sample images following initial computerized algorithm training;
  2. perform test using the additional learning sample images and adjustment to achieve the performance goals, and
  3. output a general computerized algorithm including algorithm architecture and default parameters.

16. The method of claim 15 further comprising input performance goals and expected tolerances for the computerized applications.

17. The method of claim 9 wherein the object of interest implantation on images comprises:
  (a) input expected computer application tolerances;
  (b) output initial simulated learning sample images using initial learning sample images and expected computer application tolerances;
  (c) input additional learning sample images;
  (d) output additional simulated learning sample images using the additional learning sample images and expected computer application tolerances.

18. A computerized accelerated start-up learning method for image-based decision system applications such as machine vision, non-contact gauging, inspection, robot guidance, medical imaging to accelerate learning maturity and enhance learning outcome comprising:
  (a) input start-up learning sample images;
  (b) perform object of interest implantation on images using the start-up learning sample images to generate simulated learning sample containing simulated objects of interest in the images;
  (c) perform computerized start-up learning on a general computerized algorithm using the input start-up learning sample images and the simulated learning sample images.

19. The method of claim 18 wherein the object of interest implantation on images comprises a texture mapping method extracting the defects from different products and mapping into normal images of the new product.

20. The method of claim 18 wherein the object of interest implantation on images uses at least one geometry and intensity model defining the shape and pixel intensity of objects of interest.

21. The method of claim 20 wherein the geometry and intensity models use at least one image model selected from the set consisting of
  (a) image circle model,
  (b) image donut model,
  (c) image rectangle model,
  (d) image spline curve model, and
  (e) image comet model.

22. The method of claim 18 wherein the simulated learning sample images simulate defective sample images.

23. The method of claim 18 wherein the object of interest implantation on images uses a combination of methods selected from the set consisting of:
  (a) texture mapping method extracting the defects from different products and mapping into normal images of the new product,
  (b) geometry and intensity modeling defining the shape and pixel intensity of objects of interest, and
  (c) manual image editing of known good images to create negative or positive learning sample.

24. The method of claim 18 wherein the computerized start-up learning further comprises:
  (a) input at least one start-up learning sample images;
  (b) input a computerized general algorithm;
  (c) output an application specific computerized algorithm using the at least one start-up learning sample images;
  (d) perform automatic computerized adjustment using simulated learning sample images to generate an application specific computerized algorithm.

* * * * *